United States Patent [19]

Vogelsang

[11] Patent Number: 5,090,523
[45] Date of Patent: Feb. 25, 1992

[54] HYDRODYNAMIC RETARDER

[75] Inventor: Klaus Vogelsang, Crailsheim, Fed. Rep. of Germany

[73] Assignee: Voith Turbo GmbH & Co. KG, Crailsheim, Fed. Rep. of Germany

[21] Appl. No.: 624,620

[22] Filed: Dec. 10, 1990

[30] Foreign Application Priority Data

Dec. 11, 1989 [DE] Fed. Rep. of Germany ....... 3940825

[51] Int. Cl.⁵ ............................................. F16D 57/02
[52] U.S. Cl. .................................... 188/296; 188/290; 188/294
[58] Field of Search ............... 188/264 B, 264 R, 274, 188/290, 292, 294, 296; 303/3; 60/341, 343, 342

[56] References Cited

U.S. PATENT DOCUMENTS

| | | | |
|---|---|---|---|
| 3,989,127 | 11/1976 | Staudenmaier et al. | 188/296 |
| 4,175,647 | 11/1979 | Hanke | 188/296 |
| 4,432,442 | 2/1984 | Vogelsang | 188/290 |
| 4,773,513 | 9/1988 | Herrmann et al. | 188/296 |

FOREIGN PATENT DOCUMENTS

| | | | |
|---|---|---|---|
| 2710927 | 9/1978 | Fed. Rep. of Germany | . |
| 2757237 | 6/1979 | Fed. Rep. of Germany | 188/294 |
| 1380847 | 1/1975 | United Kingdom | . |

Primary Examiner—Robert J. Oberleitner
Assistant Examiner—Chris Schwartz
Attorney, Agent, or Firm—Baker & Daniels

[57] ABSTRACT

The invention concerns a hydrodynamic retarder with a cooling circuit for the working fluid, which cooling circuit is divided into two partial flows of different cross sectional areas, between the outlet and inlet to the retarder, wherein both partial flows are separately cooled in a common heat exchanger. This assures that a small amount of working fluid will flow through the retarder after completion of the braking process, causing an aftercooling. Moreover, this assures that the retarder is more swiftly filled after a braking instruction, and a valve combination is employed for that purpose at the entrance to the retarder. Spring-loaded check valves in the line for the larger partial flow ensure a dependable circulation of the working fluid to and from the receiver.

12 Claims, 2 Drawing Sheets

HYDRODYNAMIC RETARDER

BACKGROUND OF THE INVENTION

The present invention concerns a hydrodynamic retarder specifically for installation in utility vehicles, and more particularly concerns a hydrodynamic retarder having a two flow working fluid cooling circuit between the outlet and the inlet of the retarder.

A retarder of this category is known from the German patent publication 22 38 726 (British patent 1,380,847). A compact-design retarder is joined there with a heat exchanger and a receiver for the working fluid in a common housing. The heat exchanger and the receiver are contained below the working space, another chamber for receiving leakage oil from the working space and the bearings is contained within the housing. Concerned is a retarder without a pump for filling the work space. The retarder is filled by pressurizing the receiver with compressed air, causing the entire line system to fill up with working fluid, with the rotor then assuming the circulation. The system empties again upon completion of the braking operation, with the rotor displacing the working fluid back into the heat exchanger and the receiver.

Previously known from the German patent document 35 45 660 and particularly FIG. 5 thereof (U.S. Pat. No. 4,773,513) is a retarder where the working fluid is recirculated as well without a pump, only by the impelling effect of the rotor. A line runs from the outlet on the retarder to a separately arranged heat exchanger and from there back again to the retarder. Working fluid from a separate receiver is fed into the circuit line for initiation of a braking operation.

What sets this prior retarder apart are specifically the manifold options for reduction of the air ventilation losses by injection of a fluid jet into the working space for generating an aperture type screen that prevents an energy-consuming torus vortex of air, specifically in the radially outer part of the working space. This peculiarity of the design according to FIG. 5 is constituted by the fact that the circulating mixture of air and working fluid entrains from the fluid surface in the heat exchanger just enough fluid to permit the formation of a fluid screen in the working space.

A disadvantage to this design is the fact that, while in a filling process the working space of the retarder is filled first, the lines to the heat exchanger, the heat exchanger itself and the return line must thereafter first fill themselves. Much valuable time passes before a superimposed pressure effective in terms of braking is generated within the retarder.

Also, the retarder according to aforementioned German patent publication 22 38 726, the entire line system must first be filled and subjected to superimposed pressure before the braking effect can fully set in. On the prior retarder with its compact design, this may perhaps be acceptable. However, with the retarder accommodated in the drive system of the vehicle in such a way that greater distances exist between the working space itself and the heat exchanger or the receiver for working fluid, a delayed and only gradual onset of the braking force of the retarder would be a grave operational disadvantage.

The problem underlying the invention is to provide a control system for a retarder which also in the case of spatial separation of the retarder from its heat exchanger assures also without a recirculation pump a swift availability and reliable operation in braking pauses, at minimal manufacturing cost.

SUMMARY OF THE INVENTION

This problem is solved by the characterizing features of the present invention. The invention provides for subdividing the cooling circuit line contained between the outlet and inlet on the retarder and extending through a heat exchanger that acts as a cooler in two lines with different diameters. The separation and combination of the partial flows occurs in the immediate vicinity of the outlet or inlet on the retarder, with each of the partial flows being cooled independently. A check valve each is installed in the line for the larger partial flow between the splitting point and the heat exchanger and between the heat exchanger and the emptying point before the retarder.

Achieved thereby are the following advantages: the working space of the retarder, as known, is filled in that compressed air is introduced in the receiver for the working fluid, thereby pressurizing the entire line system. Upon completion of the braking operation, i.e., when the air pressure in the receiver is reduced upon a signal coming from the operator, the receiver fills up again with working fluid through the pumping pressure of the brake rotor. Due to splitting the cooling circuit line, however, the entire amount of working fluid of the line system is not forced into the receiver. Owing to the split design of the cooling circuit line, in two lines with different diameters, a continued circulation of a partial amount of working fluid through the line with the smaller diameter is maintained also upon completion of the braking operation. The arrangement of check valves in the line for the larger partial flow, behind the splitting point on the outlet of the retarder and before the emptying point at the inlet of the retarder, assures that this line with the larger diameter will remain filled upon completion of a braking operation, so that a swift response of the retarder is possible upon a new braking instruction. The line with the smaller cross section, on the other hand, is subjected to the pumping pressure generated by the brake rotor also during braking pauses, so that a continued circulation is taking place through this line.

Since a large part of the working fluid was displaced into the mentioned receiver, outside air was able to enter the working space of the retarder through an aeration valve known from German patent publication 22 38 726. Consequently, as a rule, a circulation takes place in the line for the smaller partial flow, of a fluid-air mixture which during a braking operation is continually cooled by a cooling device, preferably by the already existing heat exchanger. This offers the advantage that the retarder is subject to aftercooling also in braking pauses and that a heat buildup in the retarder cannot occur. Also assured thereby is a removal of heat that flows into the retarder components from adjoining units, such as shift gears. Also heat which from outside acts on the retarder housing, for instance through the internal combustion engine when it features a noise abatement enclosure, is continually removed in this way. The partial oil flow recirculated in braking pauses can be introduced in the working space of the retarder in one of the ways described in the German patent document 35 45 660.

The control valve arranged in the line for the smaller partial oil flow before the emptying point on the retarder inlet has the effect that through the said line, circulation will take place only when the braking rotor is running and generates a sufficiently high pressure on the retarder outlet. This prevents the working space of the retarder from filling up with working fluid at standstill of the vehicle, which would subject the vehicle at restart to an elevated resistance through a slow start-up of the retarder. Another advantage associated with the arrangement according to the invention is that the heat exchanger and receiver may be arranged, independent of position, higher or lower or also at a greater distance from the retarder itself.

Advantageous features of a preferred embodiment of the invention are discussed hereinafter. A 2/2-way valve is installed in the line for the smaller partial flow, before the emptying point of the two lines at the inlet to the retarder, which valve acts as a control valve for the passing partial flow. This valve is provided when the heat exchanger needs to be arranged above the retarder. It serves to maintain a circulation of working fluid in the line for the smaller partial flow while nonetheless making sure that the working circuit of the retarder will not fill up in the braking pauses. The partial flows in the respective cooling circuit lines are split at a ratio of 20:80, where both partial flows can be passed through a common heat exchanger which, in turn, features separate changers of different sizes that are connected with the proper lines for the partial flows of the working fluid. Another provision is connecting the pressurizable receiver for working fluid, at the outlet of the heat exchanger on the flow side, with the line for the larger partial flow. The air, which for initiation of a braking operation has pushed the working fluid from the receiver into the cooling circuit line, will not be vented directly in the open. This is because this air carries fine particles of working fluid, which upon each end of a braking operation would be carried into the open. The result would be environmental stress and a swift loss of working fluid. Instead, the air from the receiver is upon pressure relief returned to the retarder via a separate line and only there passed into the open through a device for profile ventilation. The control valve arranged in the line for the smaller partial flow, before the emptying point at the retarder inlet, features a valve piston which by the pressure at the outlet of the retarder is stressed in the "opening" working direction. Another line from the interior of the retarder is connected with the control valve in such a way that the valve piston will upon occurrence of a vacuum be stressed as well with the "opening" working direction, always against the force of a spring with a working direction of "closing".

The effect of these measures is that at rotor standstill, i.e., at vehicle standstill, no working fluid can flow into the working space of the retarder from the line for the smaller partial flow, because the closing force of the spring keeps the valve closed. Once the braking rotor rotates and generates a sufficiently high pressure at the outlet of the retarder, the control valve for the smaller partial flow is opened at least partly, releasing the circulation of a small amount of working fluid. An at least partial opening of the control valve occurs also when in the interior of the working space, that is, in the so-called "core ring", a sufficiently high vacuum is developed, which signals that the rotor is capable of recirculating and cooling another partial amount of working fluid. Setting the check valves behind the splitting point and before the emptying point in the larger partial flow line to different opening pressures, bring about a dependable circulation of working fluid in the line for the larger partial flow only after the receiver for working fluid has been pressurized for purposes of braking. The selection of different opening pressures at the check valves ensures the proper direction of circulation, preventing the retarder from filling up through its outlet.

The invention will be more fully explained hereafter with the aid of the drawing showing two embodiments.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
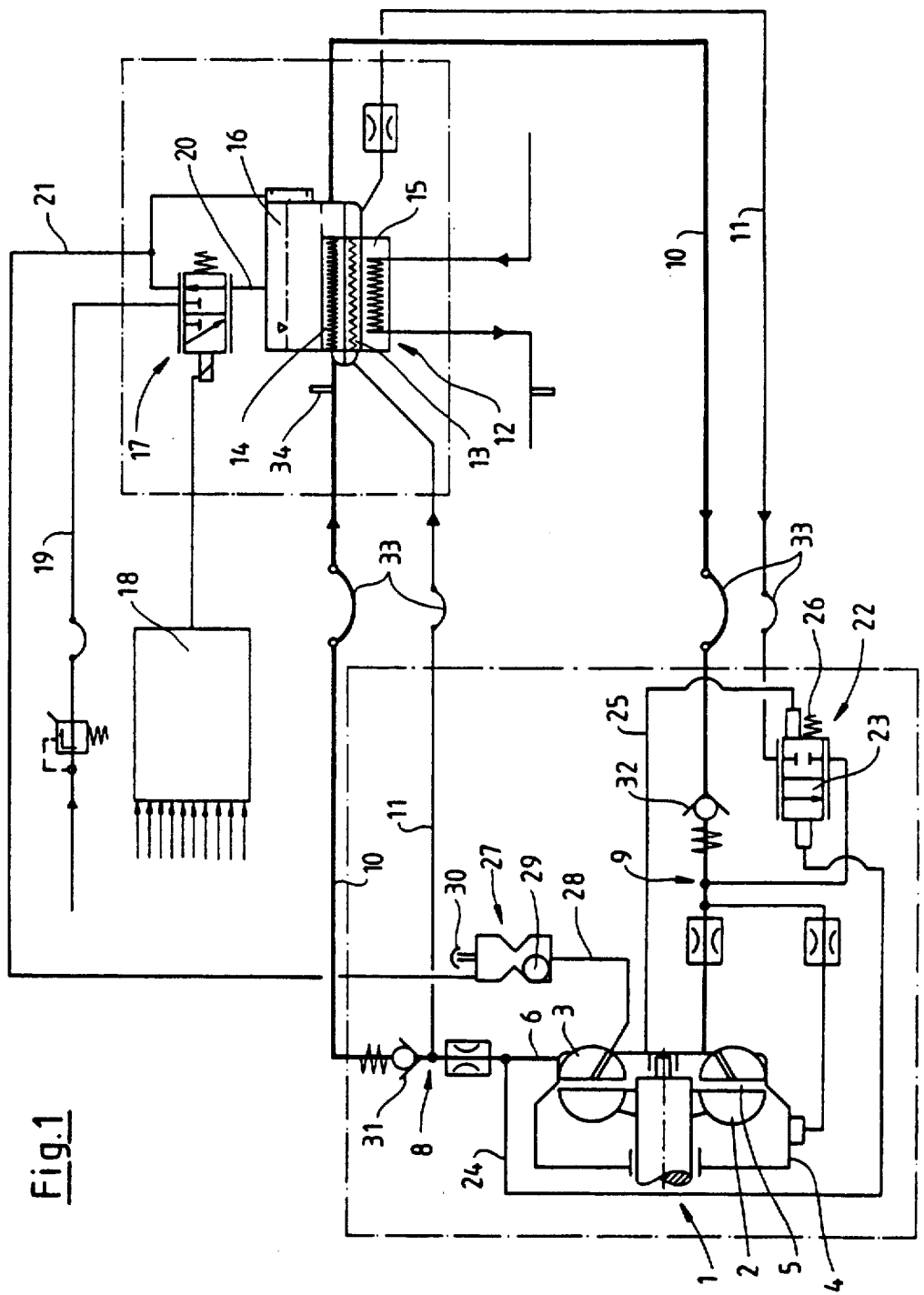
FIG. 1 shows a retarder with a heat exchanger and receiver arranged at an elevated level.

FIG. 1 illustrates a retarder 1 which is connected with a drive system (not shown), for instance a rotor impeller wheel 2 and a stator impeller wheel 3 arranged in a common housing 4 and forming a joint, torus-shaped working space 5. Located in the radially outer area of the stator impeller wheel is a connection 6 for a cooling circuit line which shortly behind the retarder splits in two lines 10 and 11, at a splitting point 8. The two lines 10 and 11 have different diameters, with the line 10 accommodating about 80% and the line 11 about 20% of the maximally recirculating working fluid flow. Both lines 10, 11 empty into a heat exchanger 12, which in the present embodiment not only is arranged at some distance from the retarder itself but also is located above the retarder. The heat exchanger 12 features two chambers 13, 14 which are connected with the lines 10 and 11 and whose heat capacity is designed for the connected lines and the fluid quantities flowing within. Both chambers 13, 14 of the heat exchanger 12 are swept by the same medium, which usually is the cooling water of the drive engine. The water-swept chamber of the heat exchanger is marked 15. The line 10 extends from the outlet of the heat exchanger 12 back to the retarder 1 passing an emptying point 9 at which occurs a joining with the line 11 which originates as well from the heat exchanger 12, before the joint cooling line empties again into an inlet port 7 on the retarder.

With the line 10, that is the one with the larger diameter, a receiver 16 for working fluid is permanently connected at the outlet from the larger chamber 14 of the heat exchanger 12. A compressed air line 19 which through a pressure control valve 17 and a connecting line 20 can pressurize the receiver it empties into. The control of the pressure control valve is effected through a controller 18 which converts the braking instruction, for instance that from the operator, or further signals to a variable pressure. Arranged before the emptying point 9, in the line 11 with the smaller diameter, is a control valve 22 fashioned as a 2/2-way valve. Within it, a valve piston 23 is in the state of rest in closing position, through a spring 26. Connected with the outlet port 6 on the retarder 1 is an additional control line 24 capable of passing the fluid pressure onto the control valve 22 with "opening" working direction. Another control line 25 connects the interior of the working space 5 on the stator impeller wheel 3 with the opposite side of the valve piston 23 on the control valve 22.

Connected with the interior of the working space 5 through a vent line 28 is a vent valve 27 known as such, which features a float 29 and a pressure relief vent 30 that leads into the open. In this vent valve 27 there empties also a vent line 21 that extends to the pressure control valve 17 and establishes in the rest position of this pressure control valve 17 the connection to the receiver 1 for the working fluid.

A spring-loaded check valve 31 is arranged in the line 10 with the larger diameter, shortly behind the splitting point 8; another check valve 32 is located in the same line 10 shortly before the emptying point 9. Both check valves are so arranged that only one direction of flow from the outlet port 6 to the heat exchanger and from the heat exchanger to the inlet port 7 is possible. The two check valves 31, 32 may also feature, instead of a spring-loaded valve body, a valve body that is stressed on the valve seat only by its dead weight.

A braking process takes place as follows: a braking instruction arrives from the controller 18, causing compressed air to proceed from the line 19 to the receiver 16. The working fluid is thereby forced from the receiver 16 into the line 10 and from there, via the inlet port 7, into the working space of the retarder. With the braking process now initiated, the rotor impeller wheel 2 now feeds working fluid to the outlet port 6 and from there in the two lines 10 and 11 running to the heat exchanger 12. In the process, the receiver 16 is subjected to compressed air pressure during the entire braking process, causing the entire circuit system to be filled with working fluid. The entire recirculated amount of working fluid flows through the two lines 10 and 11 and is cooled in a common heat exchanger swept by the cooling water of the drive engine, but in separate chambers, and is returned again. The fluid pressure developed by the rotor impeller wheel 2 is so high that both the check valve 31 in the larger line to the heat exchanger is opened and also the valve piston 23 on the control valve 22 in the smaller line 11 is forced into its opening position.

If the necessary braking force is to be reduced during a braking process, the controller 18 effects a reduction of the air pressure in the receiver 16. This enables the rotor impeller wheel to force part of the recirculating working fluid back into the receiver 16, via the line 10, by means of the dynamic fluid pressure developed by the rotor impeller wheel. The pressure is sufficient to keep the check valve 31 open, in the larger line. With the braking process completed, i.e., the air supply to the receiver 16 interrupted, working fluid continues to be pumped through the larger line 10 and through the chamber 14 in the heat exchanger 12 into the receiver 16, until the occurrence of closing pressure of the check valve 31. The fluid quantity still contained in the system is then passed back into the retarder through the smaller line 11, the pertaining chamber 13 in the heat exchanger 12 and through the control valve 22. This extensive emptying process produces inside the working space 5 a partial vacuum which through the line 25 acts on the valve piston 23, thus keeping the control valve 22 at least partly open. This causes in the line 11 a continual circulation of mixture also in the braking pauses, so that after a braking process an aftercooling of the retarder and of the fluid itself is taking place. The air displaced from the receiver 16 is forced into the vent valve 27 and from there back into the interior of the working space. The vent valve 27, moreover, is suited to separate fluid particles which by way of line 21 proceed from the receiver into the air, so that the excess air can escape demoistened, through the outlet 30. Essential in this arrangement of the check valves 31 and 32 is that the line 10 with the larger diameter remains filled during braking pauses, so that in a braking process only the fluid quantity needs to be newly introduced from the receiver 16 which completely refills the retarder itself and the line 11 again. Following the completion of a braking process, the air which—as experience shows, dissolves at high pressure in the working fluid can escape from the line 10 filled during braking pauses, back into the receiver 16 from where it can proceed via the line 21 back into the vent valve 27. Another advantage of the recirculation of a fluid-air mixture continuing also during braking pauses is not only the continued removal of any heat influx from outside but also reduced capacity losses through air ventilation—previously known by itself—and especially also its stabilization.

Figure 2:
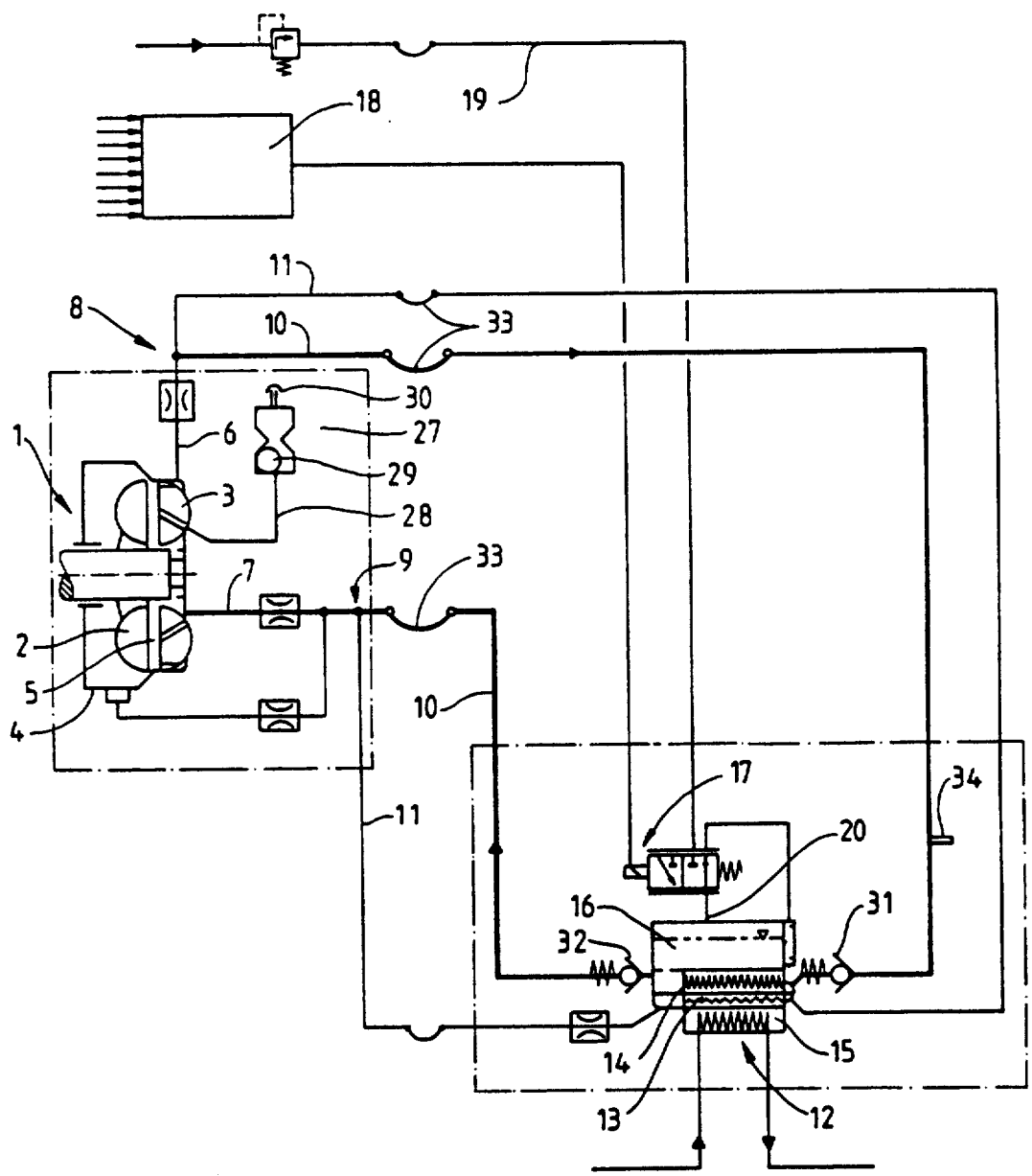
FIG. 2 shows a retarder with a heat exchanger and receiver located at a lower level.

Illustrated in FIG. 2 is a retarder with a circuit schematic corresponding to the design according to FIG. 1 where, contrary to FIG. 1, the heat exchanger, the receiver for the working fluid and the pressure control valve are located at a level lower than the retarder. All of these components are provided with the same reference numbers as in FIG. 1. In this embodiment, the check valves 31 and 32 are arranged near the entrance of the line 10 into the chamber 13 of the heat exchanger 12. While the function of the retarder is absolutely identical with that according to FIG. 1, the differing arrangement of the check valve ensures also here that the line 10 between the splitting point 8 and the emptying point 9 will remain completely filled in braking pauses. Required in the embodiment according to FIG. 1, a control valve 22 can be eliminated in the case of a lower heat exchanger arrangement because in that case there is no risk that the line 11 for the smaller partial flow will empty into the interior of the retarder.

In both of the illustrated embodiments, if the heat exchanger and the receiver are located far away from the retarder itself, the lines 10 and 11 may be interrupted by means of flexible fittings 33 for instance hose fittings, should installation conditions require such. A temperature pickup 34 and other sensors (not shown) may be arranged at one or several points of the entire system, whose signals can be processed further in the controller 18.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrodynamic retarder apparatus comprising:
  a housing including an inlet and an outlet;
  a rotor impeller wheel disposed within said housing;

a stator impeller wheel disposed within said housing;

a torus-shaped working space defined by said rotor impeller wheel and said stator impeller wheel, adapted to be filled with and emptied of working fluid, said working space in fluid communication with said inlet and said outlet;

a cooler means for removing heat from said working fluid;

a cooling circuit line in fluid communication between said outlet and said inlet, and extending to and from said cooler means, said circuit line comprising a first flow line having a first flow cross sectional area and a second flow line having a second flow cross sectional area smaller than said first flow cross sectional area, wherein the working fluid in said first flow line and said second flow line are separately cooled within said cooler means;

a splitter means for dividing said cooling circuit line into said first flow line and said second flow line, said splitter means disposed near the outlet of said housing;

means for merging said first flow line and said second flow line, said means for merging disposed near the inlet of said housing;

a first check valve disposed in said cooling circuit line between said splitter means and said cooler means;

a second check valve disposed in said cooling circuit line between said means for merging and said cooler means; and a pneumatically pressurized receiver means for filling said working space with working fluid, said receiver means in fluid communication with said cooling circuit line.

2. The hydrodynamic retarder apparatus according to claim 1, further comprising:

a 2/2-way control valve disposed in said cooling circuit line between said means for merging and said cooler means.

3. The hydrodynamic retarder apparatus according to claim 1, wherein the ratio of cross sectional areas between said first flow cross sectional area and said second flow cross sectional area is 80 to 20.

4. The hydrodynamic retarder apparatus according to claim 1, wherein said cooler means comprises:

a first chamber in fluid communication with said first flow line; and a second chamber in fluid communication with said second flow line, said second chamber and said first chamber being of different size.

5. The hydrodynamic retarder apparatus according to claim 1, wherein said receiver means includes a receiver means outlet in fluid communication with said first flow line.

6. The hydrodynamic retarder apparatus according to claim 1, further comprising:

a conduit line in fluid communication between said housing and said receiver means; and a pressure control valve disposed in said conduit line.

7. The hydrodynamic retarder apparatus according to claim 2, wherein said 2/2-way control valve is normally open by vacuum pressure in said working space communicating through said housing outlet.

8. The hydrodynamic retarder apparatus according to claim 2, wherein said 2/2-way control valve comprises:

a valve piston; and restoration means for closing said valve piston.

9. The hydrodynamic retarder apparatus according to claim 8, wherein said restoration means is a spring.

10. The hydrodynamic retarder apparatus according to claim 1, wherein said first check valve and said second check valve have different opening pressures.

11. The hydrodynamic retarder apparatus according to claim 10, wherein said first check valve is at a higher opening pressure than said second check valve.

12. A hydrodynamic retarder apparatus comprising:

a housing including an inlet and an outlet;

a rotor impeller wheel disposed within said housing;

a stator impeller wheel disposed within said housing;

a torus-shaped working space defined by said rotor impeller wheel and said stator impeller wheel, adapted to be filled with and emptied of working fluid, said working space in fluid communication with said inlet and said outlet;

a cooler means for removing heat from said working fluid;

a cooling circuit line in fluid communication between said outlet and said inlet, and extending to and from said cooler means, said circuit line comprising a first flow line having a first flow cross sectional area and a second flow line having a second flow cross sectional area smaller that said first flow cross sectional area, wherein the working fluid in said first flow line and said second flow line are separately cooled within said cooler means;

a splitter means for dividing said cooling circuit line into said first flow line and said second flow line, said splitter means disposed near the outlet of said housing;

means for merging said first flow line and said second flow line, said means for merging disposed near the inlet of said housing;

a first check valve disposed in said first flow line between said splitter means and said cooler means;

a second check valve disposed in said first flow line between said means for merging and said cooler means; and a pneumatically pressurized receiver means for filling said working space with working fluid, said receiver means in fluid communication with said cooling circuit line.

* * * * *